United States Patent [19]
Blanco

[11] Patent Number: 6,046,696
[45] Date of Patent: Apr. 4, 2000

[54] APPARATUS AND PROCESS FOR REMOTE CERTIFICATION OF DOPPLER RADAR SPEED MEASURING DEVICES

[75] Inventor: David N. Blanco, Endicott, N.Y.

[73] Assignee: DB Design LLC, Johnson City, N.Y.

[21] Appl. No.: 09/179,079

[22] Filed: Oct. 26, 1998

[51] Int. Cl.[7] .............................. G01S 7/40; G01S 13/00
[52] U.S. Cl. ....................... 342/171; 342/165; 342/169; 342/173; 342/174
[58] Field of Search .................................... 342/165, 168, 342/169, 170, 171, 172, 173, 174, 175

[56] References Cited

U.S. PATENT DOCUMENTS

| | | | |
|---|---|---|---|
| 3,018,478 | 1/1962 | Skillman et al. | 342/171 |
| 3,982,244 | 9/1976 | Ward et al. | 342/169 |
| 4,204,342 | 5/1980 | Linfield | 342/169 X |

Primary Examiner—Bernarr E. Gregory
Attorney, Agent, or Firm—Salzman & Levy

[57] ABSTRACT

A self-contained, single-unit test and calibration unit for Doppler-effect speed measurement devices (radar guns, etc.) is provided. The inventive unit is capable of performing manual, semi-automatic and automatic measurements on radar guns insuring no "missed" steps in the certification process. The unit is optionally supported by a general-purpose, digital computer such as a "PC" which may, in turn, be linked to a remote facility via modem or similar communication strategy. Either a local or a remote computer may oversee the test, calibration and certification processes. The inventive unit allows for fast and accurate certification of radar guns in the field by operators of only minimal technical skill thereby saving expense and time as radar guns no longer must be shipped to a remote certification facility.

19 Claims, 14 Drawing Sheets

APPARATUS AND PROCESS FOR REMOTE CERTIFICATION OF DOPPLER RADAR SPEED MEASURING DEVICES

FIELD OF THE INVENTION

This invention relates to electronic speed measuring devices and, more particularly, devices which use microwave frequencies and Doppler radar principles to determine the speed of a moving object.

DESCRIPTION OF PRIOR ART

Doppler radar speed measuring devices, which are commonly referred to as "radar guns," are regularly used by law enforcement agencies to monitor vehicle speeds as an aid in enforcing traffic laws. Radar guns also have other uses, such as monitoring various aspects of sporting events (e.g., measuring the speed of a baseball pitch).

Because radar guns incorporate electronic components, the performance of which can degrade over time, and because they are not intended to be adjusted by the end user, radar guns require periodic certification to correlate the speed values they display to the actual speed of the object being measured. This becomes especially important when the use of a radar gun by law enforcement agencies results in tangible punishment of offenders of vehicle traffic laws. In many such cases, the accuracy of the radar gun used by the officer is called into question in a court of law.

Since the accuracy of a radar gun may be called into question, accurate records of each certification performed on each radar gun must be maintained over the service life of the radar gun. These records must also be producible quickly on demand. In some cases it is also mandatory that a third party conduct the actual radar gun certification.

Prior to the introduction of the present invention, the apparatus and process used to certify the operation of radar guns suffered from a number of disadvantages:

(a) Certifications could be conducted only by using several discrete pieces of highly specialized and relatively costly electronic test equipment. This equipment was generally suitable for use only in a laboratory environment. The cost of this equipment, plus the skills needed to operate and maintain it, precluded most users of radar guns from having their own certification facilities in-house.

(b) Each individual piece of test equipment used in certifications was required to be traceable to the National Institute of Standards and Technology (NIST). Taken as a whole, this requirement resulted in substantial calibration costs for the owner of the test equipment, and periodically required the entire complement of equipment to be taken out of service for calibration.

(c) Facilities that did have the proper test equipment and personnel were often located some distance from the owners and users of the radar guns. This required radar guns to be shipped to and from the certification facility. This increased the possibility of the radar guns being damaged or stolen in transit and increased the amount of time the radar guns were out of service, thereby adding additional cost to the process.

(d) The required certification records were produced through manual data entry or recording techniques, based on sequential manual observations of the test equipment used in the certification process. This process was subject to human error and, because testing always proceeded in a known sequence, provided opportunities for deliberate falsification of data.

(e) Records of certifications were not necessarily stored in a secure manner, which provided opportunities for falsification of (or other alterations to) the data after a certification had been conducted and validated.

(f) Among the facilities conducting certifications, there was no standard format for certification records and reports, resulting in inconvenience for the users of radar guns and increasing the chance that certification data might be misinterpreted.

(g) Certification requirements varied significantly from user to user, sometimes even within the same law enforcement agency. Because these requirements were inconsistent, there was a very real chance that a particular radar gun, although recently certified, still would not produce accurate results under all conditions in which it might reasonably be used.

It is therefore an object of the invention to replace the discrete pieces of test equipment previously required with a single unit of test equipment having substantially lower cost, dramatically increased ease of use and complete portability, thereby allowing an average user of a radar gun to maintain a certification facility.

It is an additional object of the invention to require only one piece of test equipment to be traceable to the NIST, thereby reducing calibration costs and reducing the amount of time the equipment is out of service for calibration.

It is a further object of the invention to eliminate the need to ship radar guns to and from a separate certification facility.

It is a still further object of the invention to provide automatic recording of certification data and, where manual observations and data entry are still required, to require testing in a non-sequential way that ensures data entered during the test cannot easily be falsified.

It is yet another object of the invention to provide data security for certification records that greatly reduces the possibility that such records may be falsified or altered after a certification has been conducted and validated.

It is a still further object of the invention to provide a standard format for certification records and reports, making such records more convenient for the user to maintain and understand.

It is yet another object of the invention to provide means to establish and enforce standardized certification requirements, thereby ensuring that each certified radar gun does in fact produce accurate results under all conditions in which it might reasonably be used.

The present invention continues to satisfy the requirement for independent validation of certifications, and continues to satisfy conflict of interest concerns. Still further objects and advantages will become apparent from a consideration of the ensuing description and drawings.

BRIEF DESCRIPTION OF THE DRAWINGS

A complete understanding of the present invention may be obtained by reference to the accompanying drawings, when considered in conjunction with the subsequent detailed description, in which the same reference numbers refer to the same parts throughout the different views, and in which.

DESCRIPTION OF THE PREFERRED EMBODIMENT

Generally speaking, the invention comprises a stand-alone test and calibration facility for radar guns and other microwave, Doppler effect-based velocity measuring devices.

Figure 1:
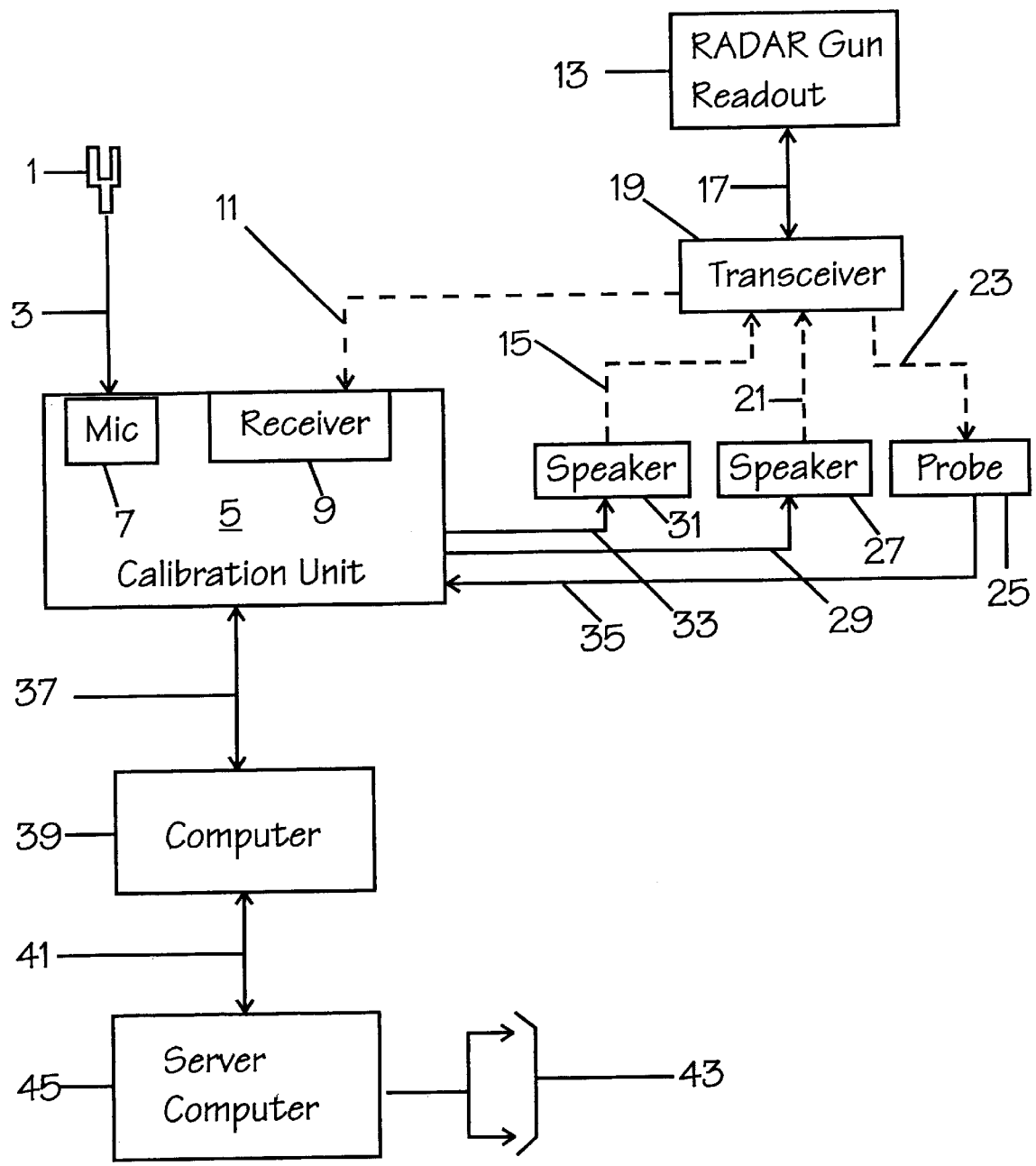
FIG. 1 is a schematic block diagram of the test, measurement and calibration system of the invention.

Referring first to FIG. 1, there is shown an overall block diagram of the test and calibration system of the invention. An audio frequency tuning fork 1 is provided for generating a single, constant-frequency audio tone, typically in the range of 465 Hz to 12.5 kHz. Depending on the operating band of the radar gun with which the tuning fork is to be used (X-Band, K-Band or Ka-Band), the frequency of the tone correlates to a particular speed in miles per hour. The audio frequency, radar gun band and simulated speed are generally marked on the tuning fork by its manufacturer.

The sound 3 generated by tuning fork 1 is received by microphone 7 housed within calibration unit 5. Microphone 7 is typically an electret condenser cartridge such as Panasonic Model No. WM-54BT. It will be obvious to those skilled in the art that other types and/or styles of microphones could be utilized. An external microphone could also be utilized if operating circumstances required.

Calibration unit 5 also contains a microwave receiver 9 adapted to receive microwave energy 11 emitted by a radar gun microwave transceiver 19. Receiver 9 is type TGS456AA, custom-manufactured by TelGaAs for dB Design, the assignee of this invention.

A pair of acoustic transducers, typically speakers 27 and 31, are connected to calibration unit 5 by means of connections 29 and 33, respectively. Speakers 27, 31 are adapted to output audio tones 21 and 15, respectively, under the control of calibration unit 5; typical devices found suitable for use are Sony Model No. SRS-P3, a type commonly used as external speakers for portable personal stereos. Other types could easily be substituted as conditions require. It is important to note that speakers utilizing a non-metallic grill are required, as speakers with metal grills have been determined to produce unacceptable levels of feedback to microwave transceiver 19.

Audio tone 21 from speaker 27 typically corresponds to a patrol speed (i.e., the speed of a patrol car) and audio tone 15 corresponds to a speed of a target (not shown).

A microwave power density probe 25, adapted to receive microwave energy 23 from radar gun transceiver 19, is also connected to calibration unit 5 by connection 35. A typical microwave power density probe found suitable for use is the Narda Model 8721D. Connection 35, located in the front panel of calibration unit 5, is typically a Lemo part number EGG.3B.308.CNL and is directly compatible with probe 25. An external cable (not shown) could also be utilized between connection 35 and power density probe 25 if operating circumstances required.

A radar gun readout 13, generally supplied by the manufacturer of radar gun transceiver 19, is connected to radar gun transceiver 19 by connection 17. Connection 17 may be external to radar gun readout 13 and radar gun transceiver 19, or all three items 13, 17, 19 may be enclosed within the same physical housing, depending on the manufactured style of the radar gun.

A computer system 39, described in more detail herein below, is attached by connection 37 to calibration unit 5. Computer 39 forms a client in a network used for remote data storage and retrieval. Computer 39 is connected to server computer 45, described in more detail herein below, by means of network connection 41. Network connection 41 may be any known network interconnection means in a LAN, WAN or other network topology well known to those skilled in the art. Additional client computers (not shown) may also be connected to server computer 45 by additional network connections 43.

The functions of the various components in FIG. 1 are described in more detail hereinbelow.

Figure 2:
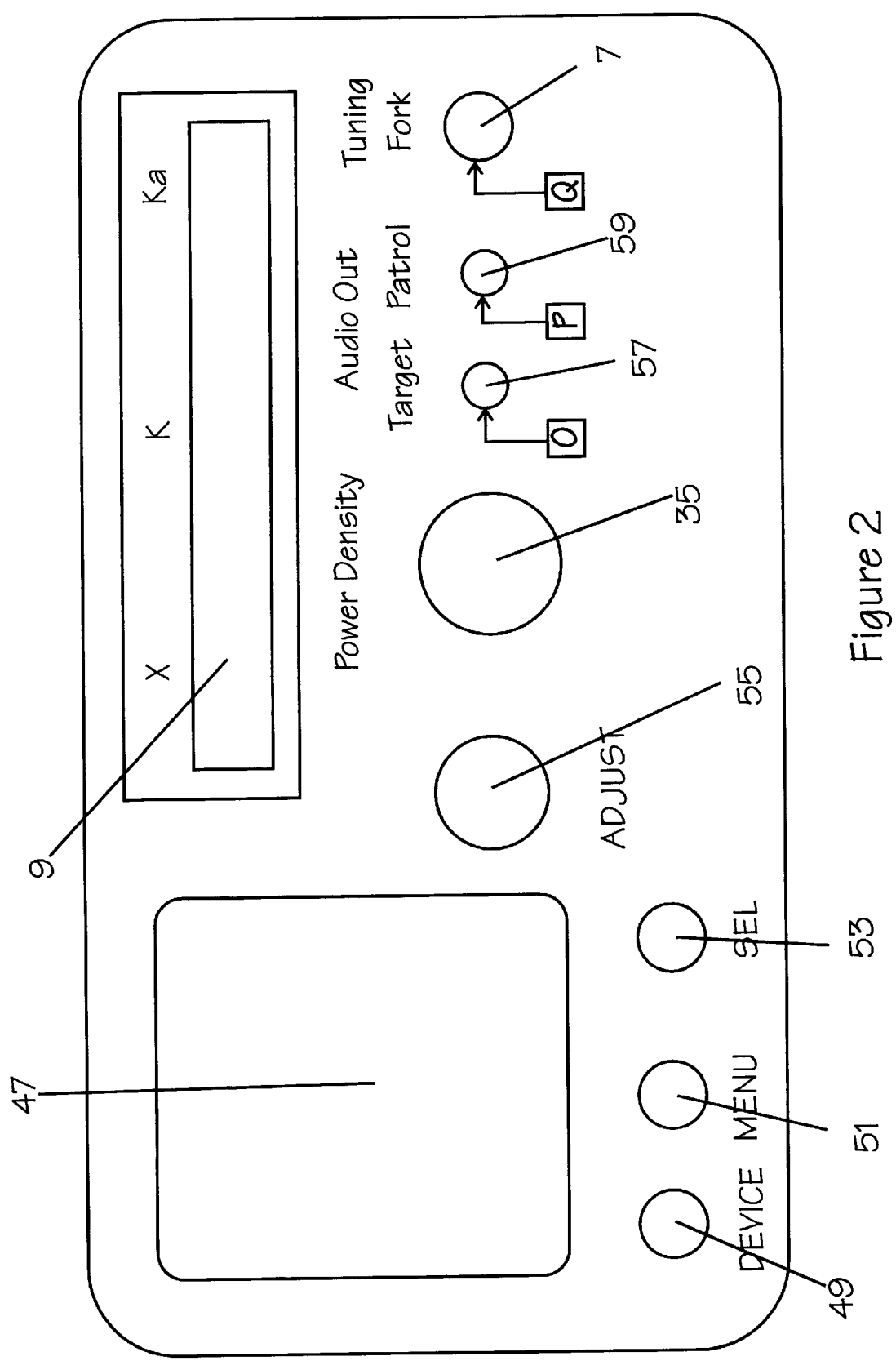
FIG. 2 is front view of the control panel of the preferred embodiment of inventive calibration apparatus.

Referring now to FIG. 2, there is shown the face place of calibration unit 5 (FIG. 1). Previously described components microphone 7, microwave receiver 9 and power density probe connection 35 are all shown.

In addition, a programmable display 47 is visible on the front panel of the calibration unit. Display 47 is an LCD type well known to those skilled in the art; a typical display found suitable for use is the Hantronics Model No. HDM128GS12L-1-N30F. Other display technologies could be substituted to suit a particular operating environment. Display 47 conveys both instructions and/or data to a user (not shown).

User option selection switches 49, 51 and 53, labeled as DEVICE, MENU and SEL, respectively, provide for setting various user options described in detail hereinbelow. Switches 49, 51, 53 are push-buttons, well known to those skilled in the art; a typical device found suitable for use is the catalog number CRS020601N, supplied by ITT Industries.

User option rotary selector 55, labeled as ADJUST, also provides for setting various user options described in detail herein below. Rotary selector 55 is a 2-bit binary encoder well known to those skilled in the art, which produces two out-of-phase signals that, combined, indicate which direction the selector is being rotated by means of their phase difference. A typical device found suitable for use is Alps Components part number EC11B15DX3MF20N.

Connectors 57 and 59 are provided for connection of speakers 31 and 27, respectively, via connections 33 and 29, respectively. Connectors 57 and 59 are audio jacks well known to those skilled in the art; typical devices found suitable for use are Switchcraft type 43A.

Figure 3A:
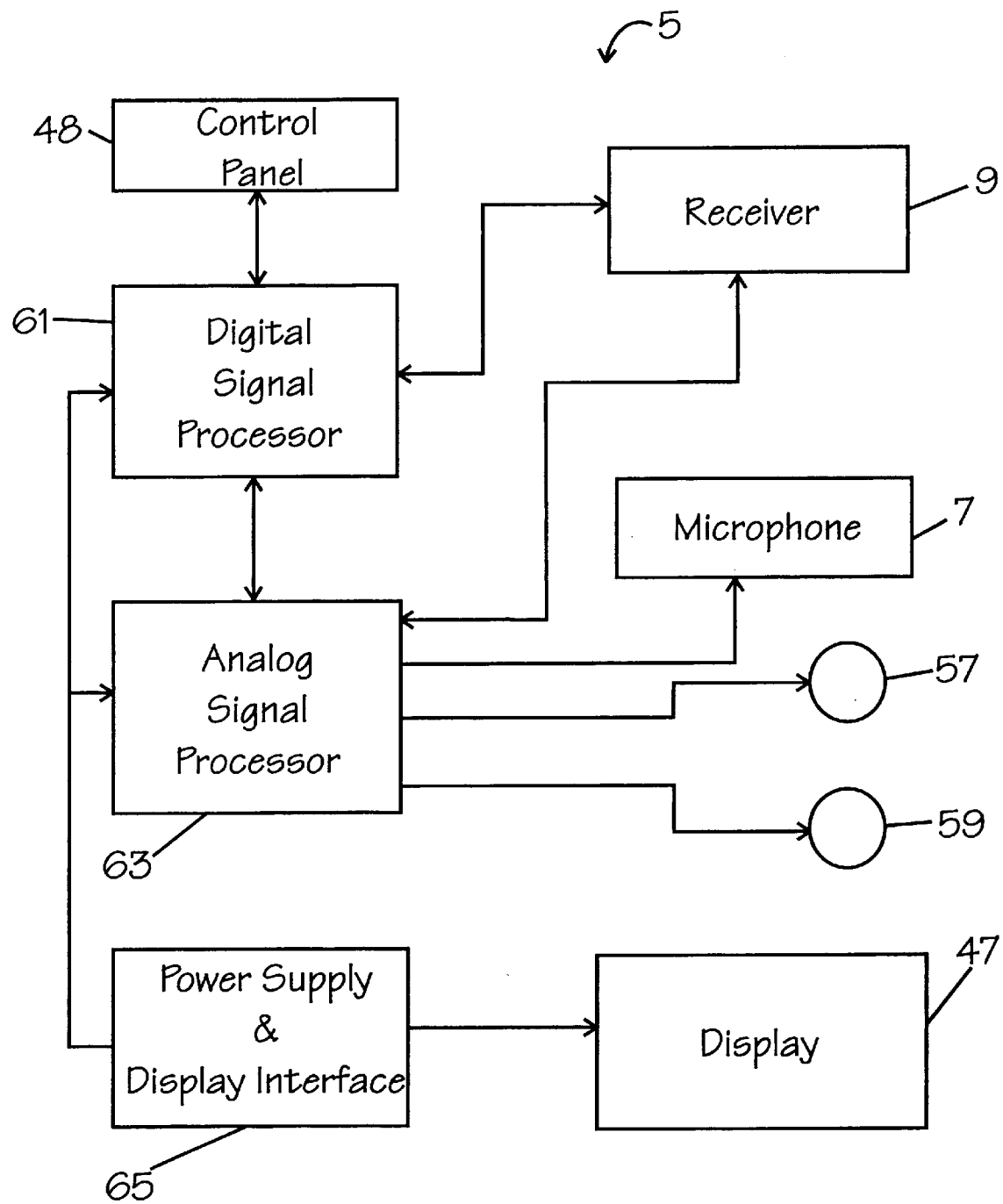
FIG. 3a is a schematic block diagram of the calibration apparatus shown in FIG. 2.

Referring now to FIG. 3A, there is shown a schematic block diagram of the calibration unit 5. Control panel 48 consists of a circuit board or other mounting surface which contains the front panel controls: the DEVICE push-button 49, the MENU push-button 51, the SEL push-button 53 and the ADJUST rotary selector 55, all previously described.

An electronic circuit 61, described in more detail herein below, contains the items required to provide the digital signal processing and control aspects of calibration unit 5.

An electronic circuit 63, described in more detail herein below, contains the items required to provide the analog signal processing and control aspects of calibration unit 5.

An electronic circuit 65, described in more detail hereinbelow, contains the items required to provide the power supply aspects of calibration unit 5.

A programmable display 47, previously described in association with FIG. 2.

A receiver 9 for microwave signals, described in more detail herein below.

Microphone 7 and connectors 57, 59 are also shown.

Figure 3B:
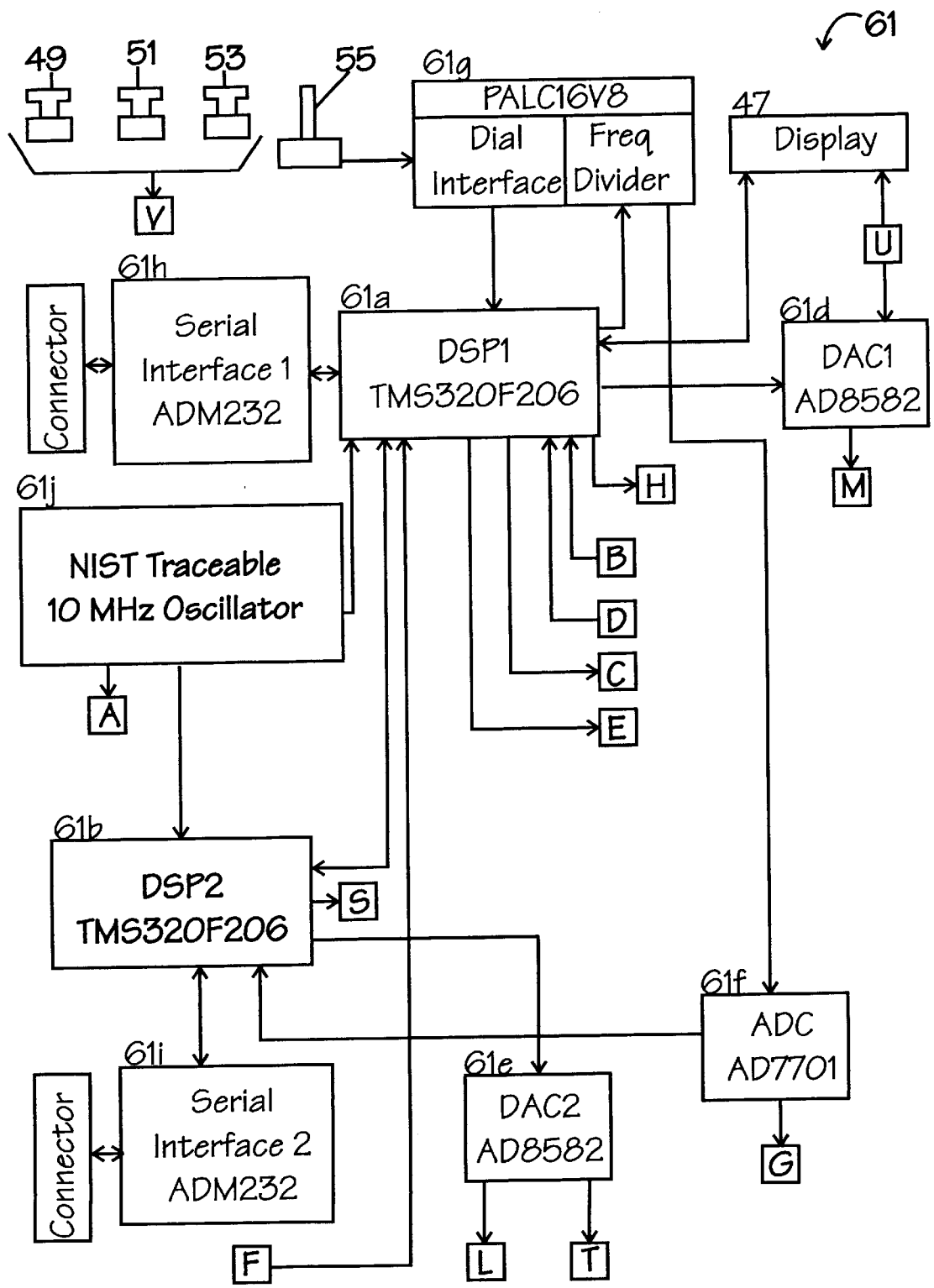
FIG. 3b is a schematic block diagram of a digital signal processor forming a part of the calibration apparatus shown in FIG. 2.
Figure 3B:
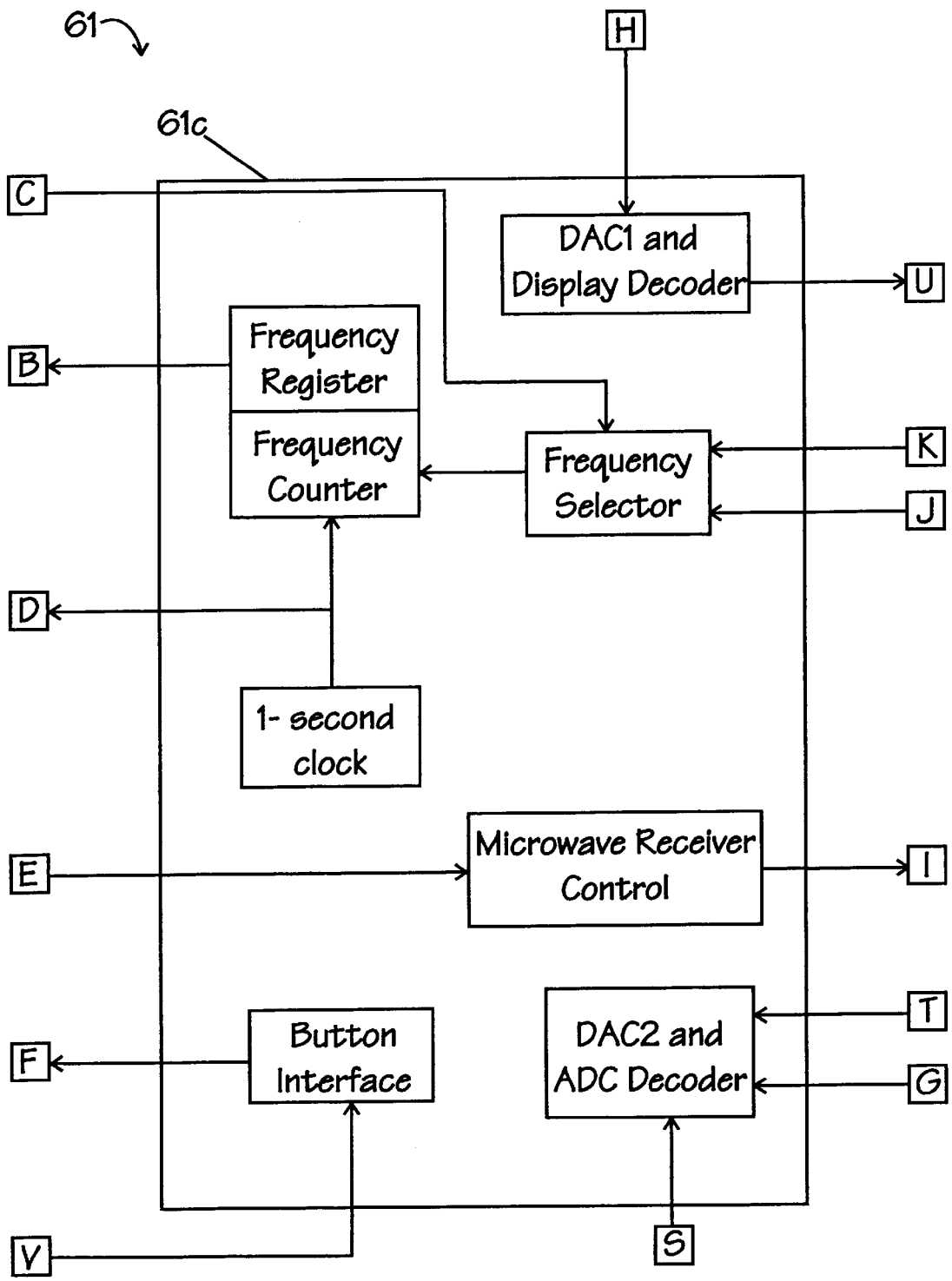

Referring now to FIG. 3B, there is shown a detailed block diagram of digital signal processor 61. Digital Signal Processor consists of:

A Texas Instruments TMS320F206 Digital Signal Processor (DSP1, 61a), performs the majority of the control and data processing operations. The data bus of DSP1 61a is connected to the data lines of display 47, DAC1 61d, and a frequency register within Complex Programable Logic Device 61c, using a number of bits as appropriate to each device but always beginning at bit 0. Several control and address lines of DSP1 61a are connected to CPLD 61c to cause CPLD 61c to decode certain address ranges and provide device select strobes for display 47, DAC1 61d and the frequency register within CPLD 61c. DSP1 61a also contains software which depends upon the particular address decoding scheme of CPLD 61c and allows DSP1 61a to perform its functions.

A second Texas Instruments TMS320F206 (DSP2, 61b), performs secondary control and data processing operations for calibration unit 5. DSP2 61b communicates bidirectionally with DSP1 61a via the synchronous serial bus available on both DSPs 61a, 61b. The lower 12 bits of the data bus of DSP2 61b are connected to the data lines of DAC2 61e and ADC 61f. Several control and address lines of DSP2 61b are connected to CPLD 16cto cause CPLD 16cto decode certain address ranges and provide device select strobes for DAC2 61e and ADC 61f. DSP2 61b also contains software which depends upon the particular address decoding scheme of CPLD 16cand allows DSP2 61b to perform its functions.

A Cypress CY7C374i Complex Programmable Logic Device (CPLD, 61c), is configured to perform the functions of a 1-second clock, a frequency counter and register, a frequency selector, a button interface, an address decoder for DAC1 61d and display 47, an output control register for microwave receiver 9, and an address decoder for DAC2 61e and ADC 61f. The operation of each of these functions will become clear while reading the description of operation herein below.

An Analog Devices AD8582 12-bit DAC (DAC1, 61d), is used to provide the output waveform that ultimately results in the audio tone produced by the target speaker 31. DSP1 61a supplies values over its data bus to DAC1 61d as directed by software to accomplish this task.

A second Analog Devices AD8582 12-bit DAC (DAC2, 61e), is used to provide the output waveform that ultimately results in the audio tone produced by the patrol speaker 27. DSP2 61b supplies values over its data bus to DAC2 61e as directed by software to accomplish this task.

An Analog Devices AD7701 16-bit ADC (ADC, 61f), is used to convert the analog voltage from the power density probe 25 into a binary value, which in turn may be retrieved by DSP2 61b via its data bus.

A Cypress PALC16VB programmable logic device (PAL, 61g), is used to convert the output of rotary selector 55 to interrupt and direction signals, which are supplied to DSP1 61a to allow the software therein to monitor the direction in which rotary selector 55 is being turned.

An Analog Devices ADM232 (serial interface 61h), provides RS-232 to logic level translation for the asynchronous serial port of DSP1 61a. This serial port may be used to update the software in DSP1 61a, and is also used in communication between the calibration unit 5 and the client computer 39.

A second Analog Devices ADM232 (serial interface 61i), provides RS-232 to logic level translation for the asynchronous serial port of DSP2 61b. This serial port may be used to update the software in DSP2 61b.

A 10 mHz oscillator, 61j, is adapted to provide a stability of 0.2 PPM over a temperature range of 0 to 70 degrees Celsius and to be traceable to the National Institute of Standards and Technology (NIST). Oscillator 61j is a T26K850, custom-manufactured for dB Design by Bliley Electric Co. of Erie, Pa.

Figure 3C:
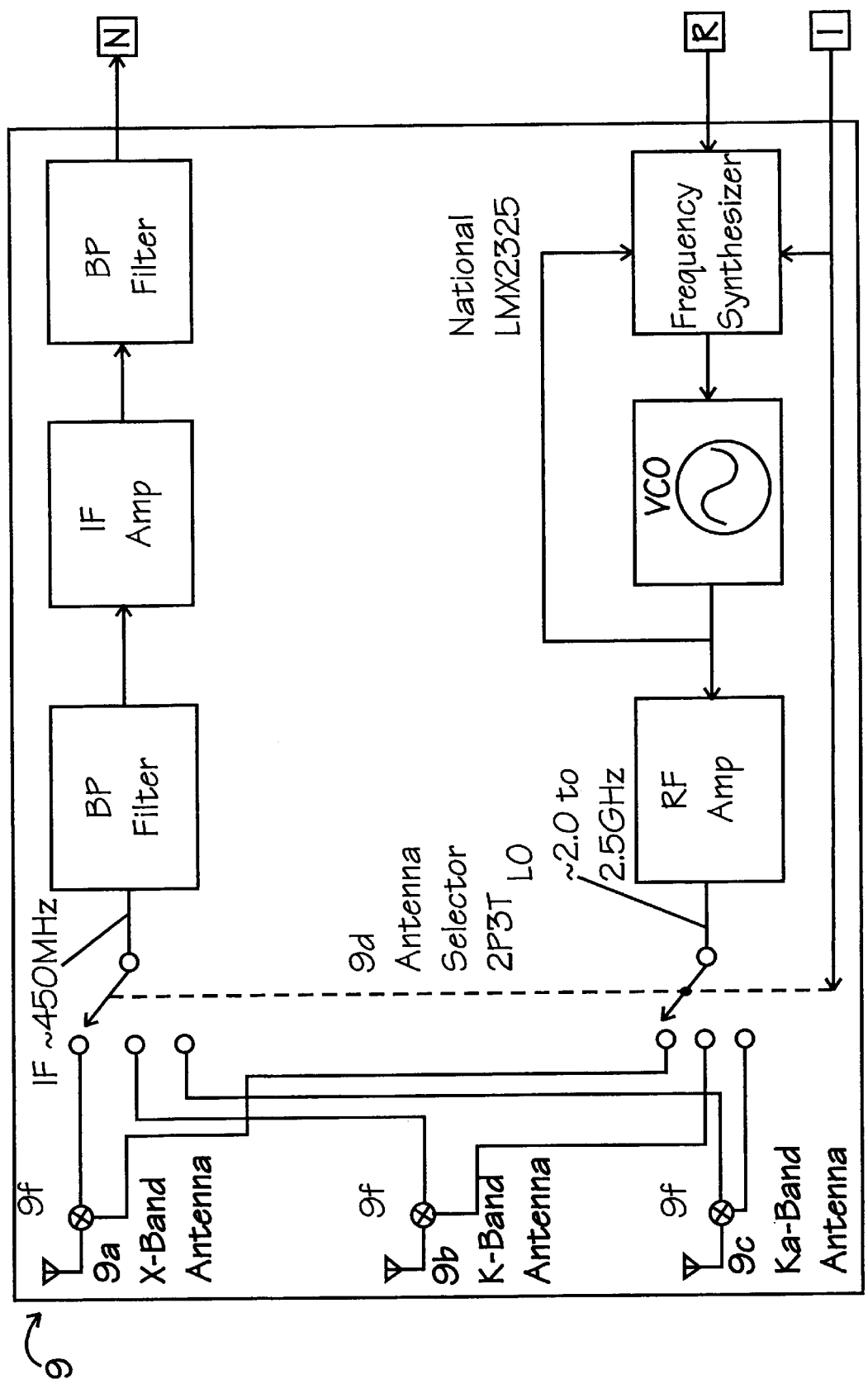
FIG. 3c is a schematic block diagram of a microwave receiver forming a part of the calibration apparatus shown in FIG. 2.

Referring now to FIG. 3C, there is shown a detailed block diagram of microwave receiver 9, integral to calibration unit 5.

A microwave antenna 9a is adapted to receive signals in the range of 10.525 GHz, +/-25 mHz, otherwise known as X-Band.

Microwave antenna 9b is adapted to receive signals in the range of 24.1505 GHz, +/-100 mHz, otherwise known as K-Band.

Microwave antenna 9c is adapted to receive signals in the range of 33.400 to 36.600 GHz, +/-100 mHz, otherwise known as Ka-Band.

Antenna selector 9d, comprising a two-pole three-position electronic switch, allowing only one of the antennas 9a, 9b, 9c to be selected for use at a particular time. The selection made by the switch is controlled by output signals from the microwave receiver control register function of CPLD 61c, the input to which is in turn supplied by DSP1 61a under control of its software.

Frequency synthesizer and voltage controlled oscillator 9e is a National Semiconductor LMX2325. This device utilizes the 10 Mhz signal from oscillator 61j to produce an RF signal in the range of 2.0 to 2.5 GHz. The exact frequency produced is controlled by output signals from the microwave receiver control register function of CPLD 61c, the input to which is in turn supplied by DSP1 61a under control of its software.

RF amplifier 9I is constructed from discrete components (not shown). This device amplifies the signal produced by frequency synthesizer 9e and drives the result through antenna selector 9d.

Harmonic mixer 9f is also constructed from discrete components(not shown). Mixer 9f combines the RF signal from RF amplifier 9i with the signal from the currently selected antenna 9a, 9b, 9c and produces a resulting IF in the range of 450 mHz. This IF represents the difference between the selected harmonic of the 2.0 to 2.5 GHz signal from frequency synthesizer 9e and the signal produced by radar gun transceiver 19. The selection of harmonics is explained in detail in the description of operation.

A pair of band pass filters and an IF amplifier 9g, are implemented using discrete components. The bandpass filters and the IF amplifier removes unwanted harmonic frequencies being returned by the part of the harmonic mixer 9f associated with the currently selected antenna 9a, 9b, 9c.

A prescalar, comprised of discrete components, takes the filtered output of band pass filter 9g and produces a +/−0.5 volt IF signal in the range of 11 mHz to 14 mHz. This frequency is used in the calculation of the actual output frequency of the radar gun transceiver 19, as described later in the description of operation.

Figure 3D:
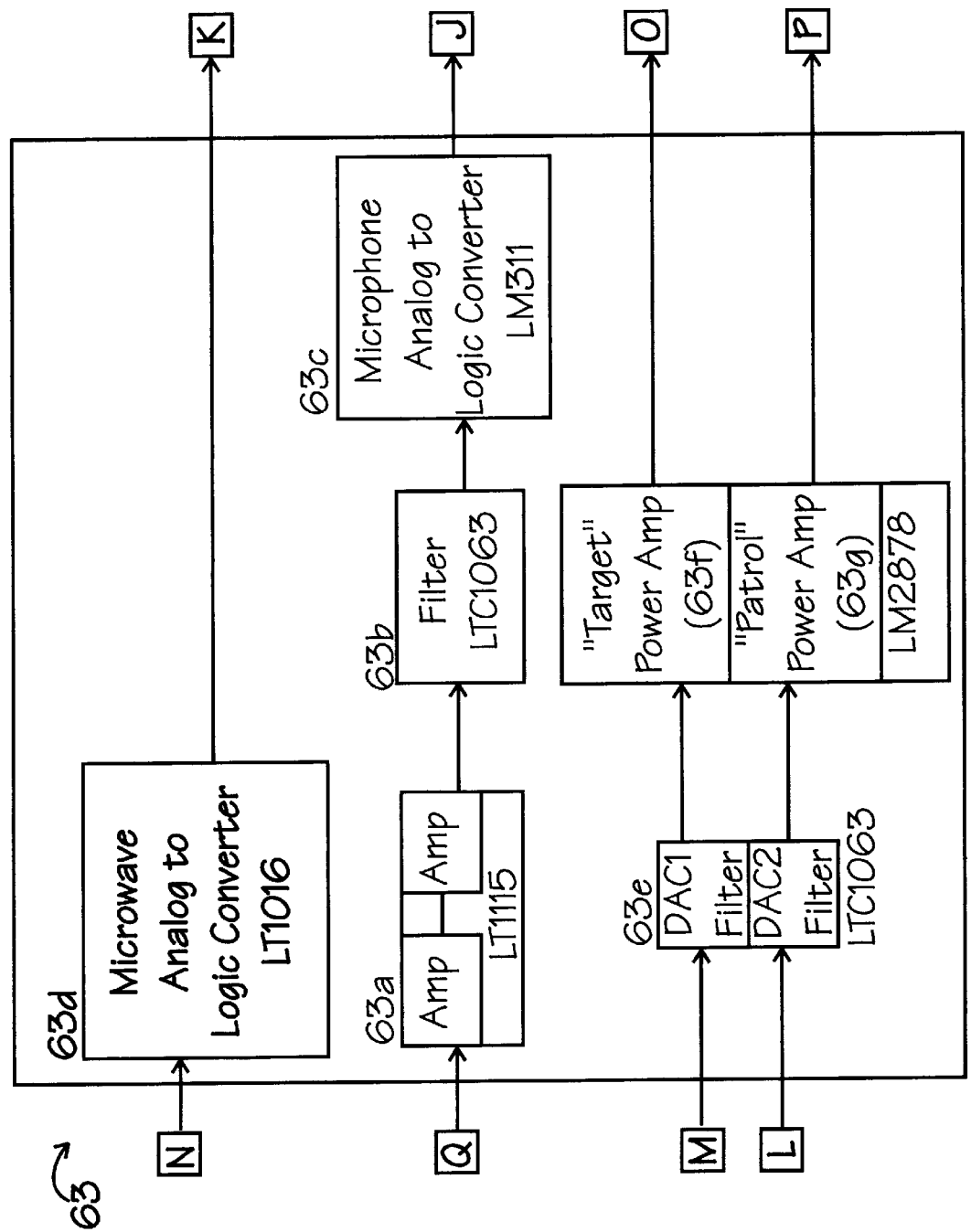
FIG. 3d is a schematic block diagram of an analog signal processor forming a part of the calibration apparatus shown in FIG. 2.

Referring now to FIG. 3D, there is shown a detailed block diagram of electronic circuit 63, integral to calibration unit 5.

A pair of Linear Technologies type LT1115 ICs comprise a preamplifier 63a for microphone 7. Preamplifier 63a is configured with feedback components to provide a total gain of 1000 with a rolloff frequency of 15 kHz.

A Linear Technologies LTC1063 IC acts as a 5-pole filter 63b which receives the signal from microphone preamplifier 63a and removes unwanted noise.

A National Semiconductor LM311 IC comparator 63c receives the analog output of filter 63b and converts that signal to a logic-level signal of the same frequency. The output of comparator 63c is connected to one of the frequency selector inputs of CPLD 61c.

A Linear Technologies LT1016 IC (63d) acts as a high-speed comparator to convert the +/−0.5-volt, 11 mHz to 14 mHz signal from microwave receiver 9 into a logic-level signal of the same frequency. The output of comparator 63d is connected to one of the frequency selector inputs of CPLD 61c.

A pair of Linear Technologies LTC1063 ICs act as filters 63e to smooth the sine waves produced by DAC1 61d and DAC2 61e, producing audio tones for output to speakers 27 and 31.

Two halves of an LM2878 IC are configured as audio amplifiers 63f and 63g. Amplifier 63f receives the output of the filter 63e associated with DAC1 61d. The output of amplifier 63f goes to connector 57 and then to the target speaker 31. Amplifier 63g receives the output of the filter 63e associated with DAC2 61e. The output of amplifier 63g is connected to the patrol speaker 27 through connector 59.

Figure 3E:
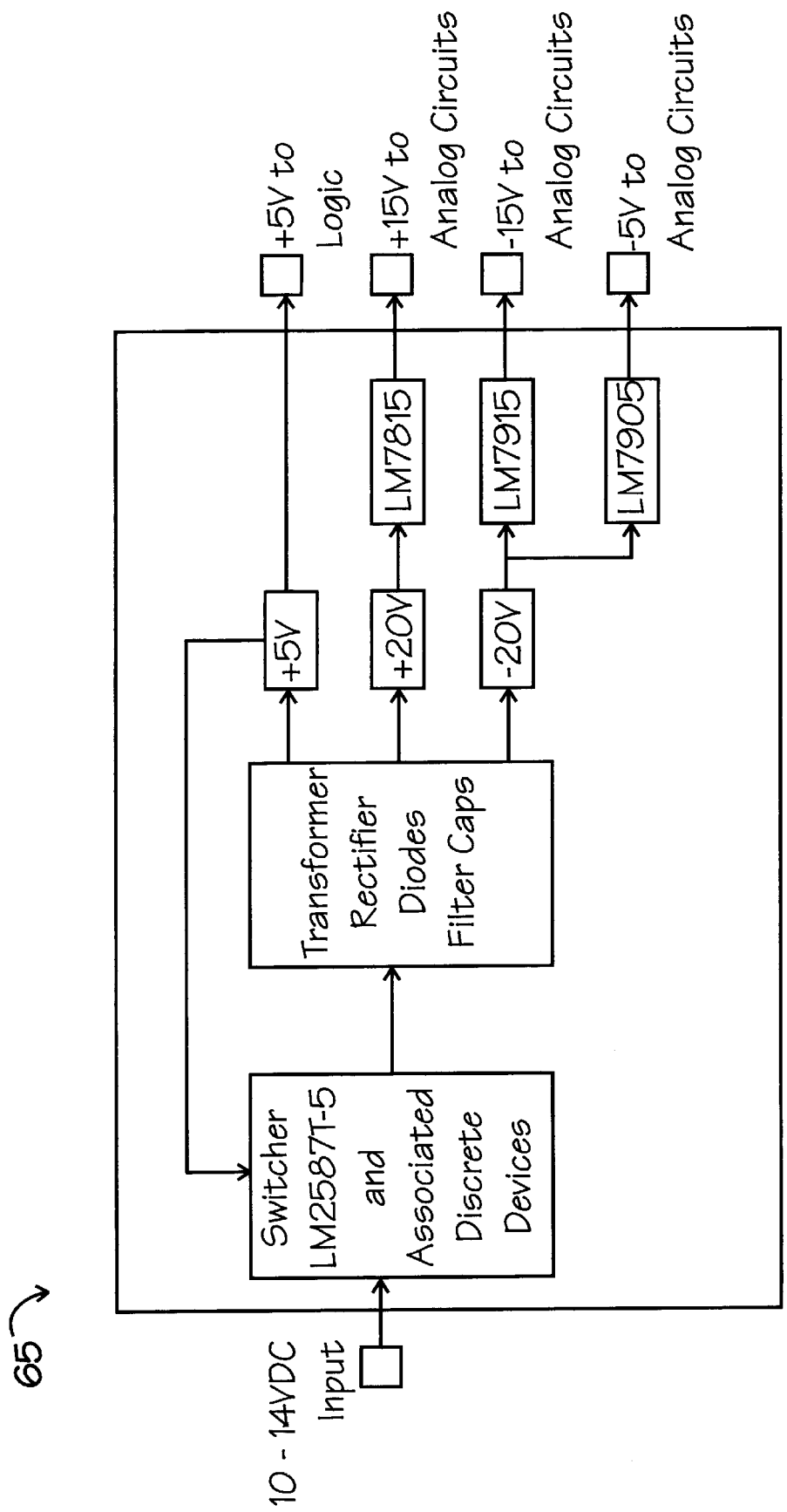
FIG. 3e is a schematic block diagram of a power supply and controller forming a part of the calibration apparatus shown in FIG. 2.

Referring now to FIG. 3E, there is shown a detailed block diagram of electronic circuit 65, integral to calibration unit 5.

A National Semiconductor LM2587T-5 IC, along with supporting discrete components, well known to those skilled in the art, form a switching power supply that directly produces 5 volts DC as required by the logic circuits of calibration unit 5, and also produces +/−20 volts DC for secondary purposes.

A National Semiconductor LM7815CTB IC regulates +20 volts to +15 volts DC as required by the analog circuits of calibration unit 5.

A National Semiconductor LM7915CTB IC regulates −20 volts to −15 volts DC as required by the analog circuits of calibration unit 5.

A National Semiconductor LM7905CTB IC regulates −20 volts to −5 volts DC as required by the analog circuits of calibration unit 5.

Figure 4:
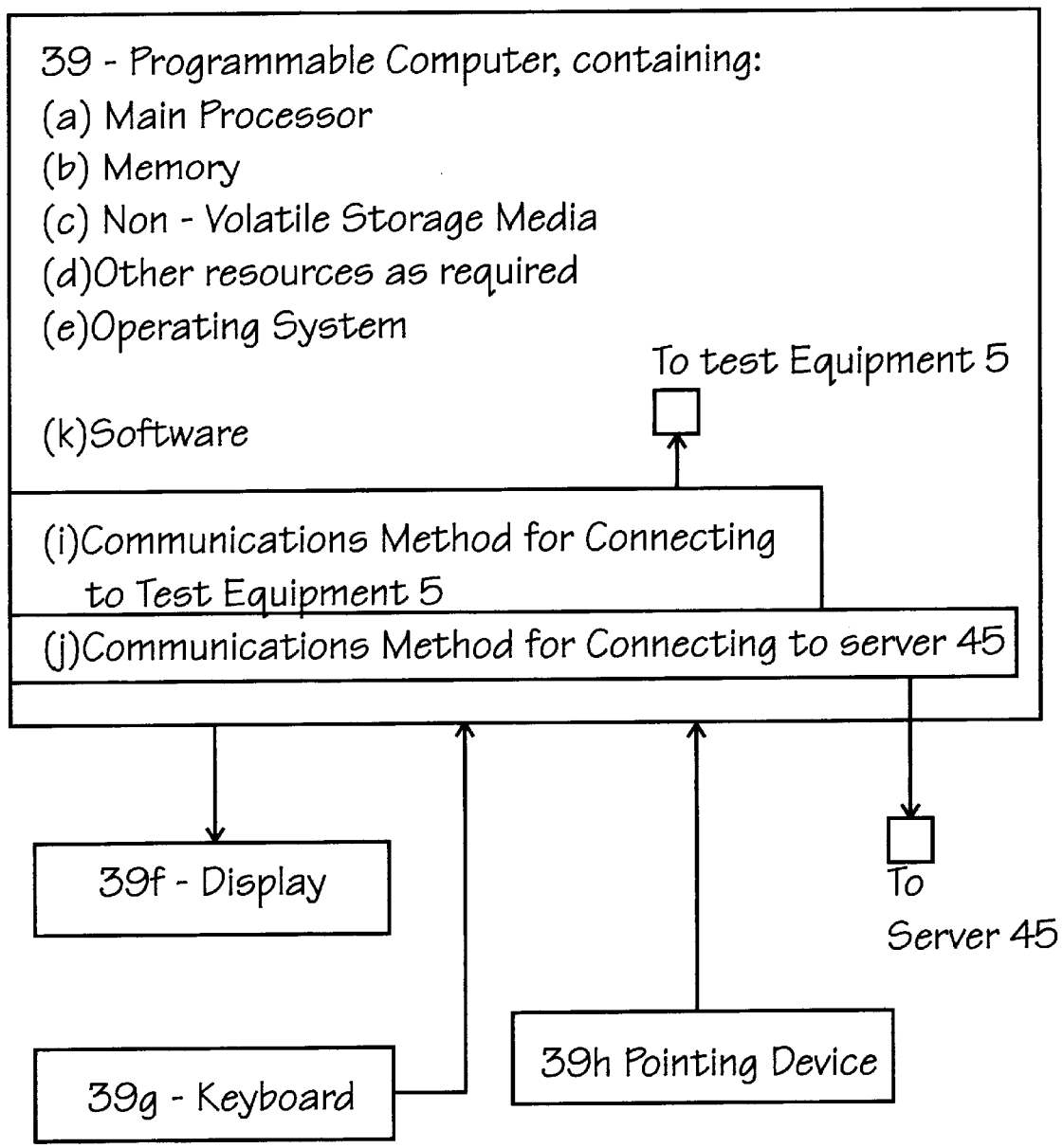
FIG. 4 is a block diagram of a computer system for use with the inventive apparatus.

Referring now to FIG. 4, there is shown a detailed block diagram of a computer system 39, which forms a client in a network used for remote data storage and retrieval.

Programable computer 39 comprises a main processor, memory, non-volatile storage media and other I/O resources as required, allow computer system 39 to run a commercial operating system software suited to the requirements of the invention. Those skilled in the art will recognize that a large variety of computer hardware exists that can be combined in a variety of suitable fashions to meet the operating requirements of the invention.

The operating system is typically Windows 95®, Windows 98® or Windows NT®, all produced by Microsoft Corporation. Those skilled in the art will recognize that other operating systems offering comparable facilities could also be used to meet the requirements of the invention.

A display 39f, commonly a video screen, and user input means, commonly a combination of a keyboard 39g and pointing device 39h, allow a user to interact with computer system 39. Those skilled in the art will recognize that a large variety of display devices exists, and that other means of user input (touch screen, voice recognition, pen-based, etc.) may also be used in addition to, or in place of, a keyboard and pointing device.

Also included in calibration unit 5 is a communication port 39i with a calibration unit 5, commonly an RS-232 serial port. Those skilled in the art will recognize that other means of communication exist (RS-422, RS-485, parallel, etc.) and may be used in place of an RS-232 serial connection if conditions require.

Calibration unit 5 also includes a "network" communication means allowing connection to a remote server 45. A telephone modem (not shown) is typically used. Those skilled in the art will recognize that a variety of other communication means exist that may be used in place of a telephone modem if conditions require.

Programmable computer 39 along with operating system software allow running application software developed by dB Design expressly to provide the required functions of a client in a data storage and retrieval network and to interact directly with the calibration unit 5 in support of the goals of the invention, and described in more detail in the description of operation.

Figure 5:
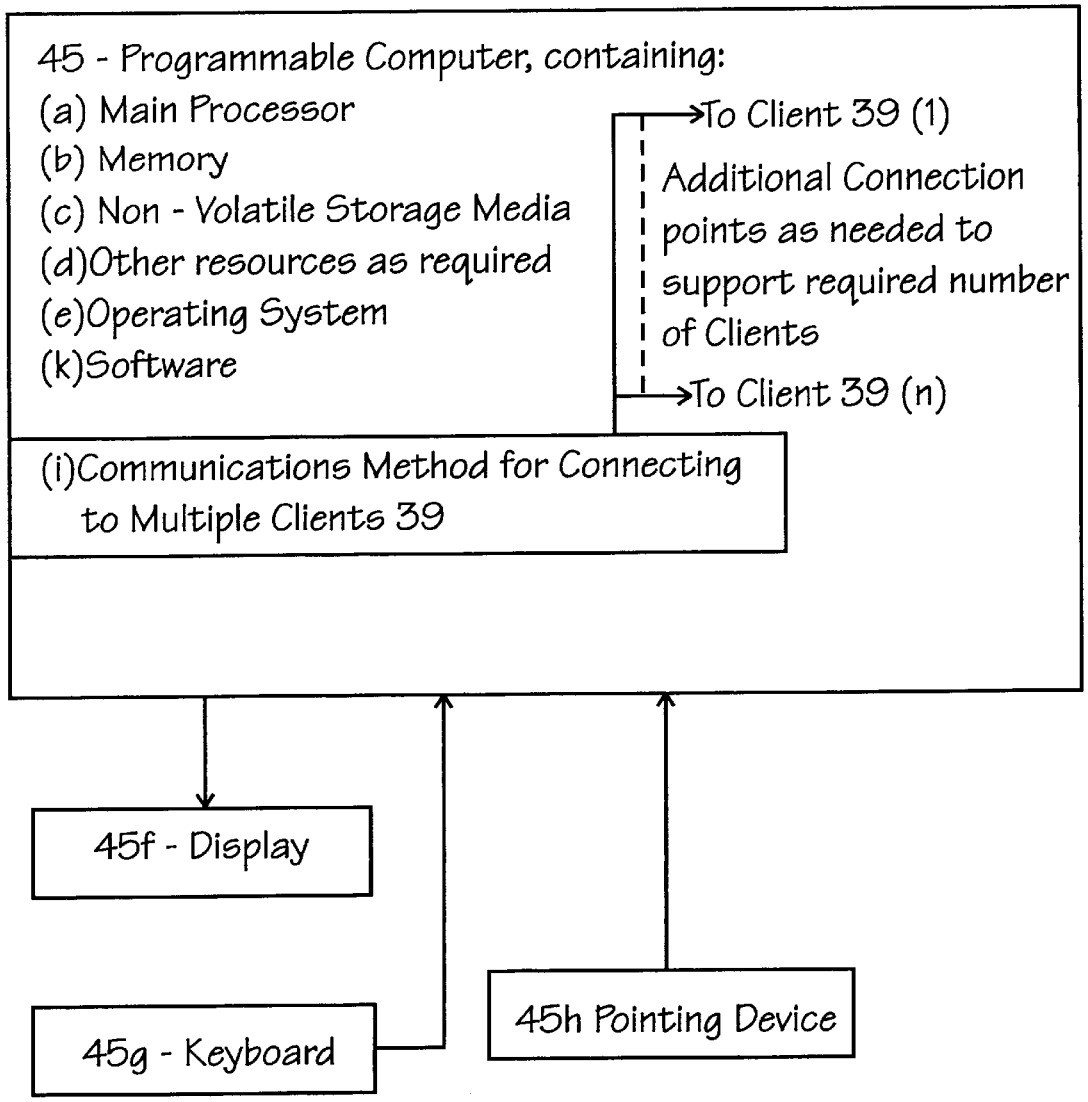
FIG. 5 is a block diagram of a server computer system.

Referring now to FIG. 5, there is shown a detailed block diagram of a computer system 45 which forms a server for one or more client computers in a network used for remote data storage and retrieval.

Computer system 45 consists of a main processor, memory, non-volatile storage media and other I/O resources as required, allow computer system 45 to run a commercial operating system suited to the requirements of the invention. Those skilled in the art will recognize that a large variety of computer hardware exists that can be combined in a suitable fashion to meet the requirements of the invention.

The operating system is typically Windows 95®, Windows 98® or Windows NT®, all produced by Microsoft Corporation. Those skilled in the art will recognize that other operating systems offering comparable facilities could also be used to accomplish the required end result.

A display 45f, commonly a video screen, and input means 45g, commonly a combination of a keyboard and pointing device 45h, allow a user to interact with computer system 45. Those skilled in the art will recognize that a large variety of display devices exists, and that other means of user input (touch screen, voice recognition, pen-based, etc.) may also be used in addition to, or in place of, a keyboard and pointing device.

Also included in computer system 45 are communication ports 45i allowing communication with multiple client computers 39(FIG. 4), commonly using a series of telephone modems. Those skilled in the art will recognize that a variety of other communication means exist that may be used in place of a telephone modems if conditions require.

Software developed by dB Design, running on computer system 45 provides the required functions of a server in a data storage and retrieval network, specifically designed to interact with the software running in multiple client computers 39, and described in more detail in the description of operation.

Operation of Invention

The following paragraphs describe the operation of each part of the present invention, including the low-level details of each test function within the calibration unit 5.

Speed Simulation Function of Calibration Unit 5

The calibration unit 5 can perform a Speed Simulation test in two modes: Fixed Mode and Moving Mode. In either mode, audio tones are used to simulate the Doppler shift effect used by a radar gun to measure the speed of a moving object.

Fixed Mode uses only the target speaker 31 and a single audio tone to simulate the condition where the radar gun 13/17/19 is stationary while observing the speed of a moving object (the target speed).

Moving Mode uses both the target speaker 31 and patrol speaker 27, with an audio tone being emitted by each, to simulate the condition where the radar gun is in motion (the patrol speed) while observing the speed of a moving object (the target speed). The patrol speed is simulated first; when the radar gun locks onto this patrol speed, a sequence of target speeds is then generated to certify the radar gun for each target speed at that particular patrol speed. The process is then repeated for additional patrol speeds if required.

Figure 6:
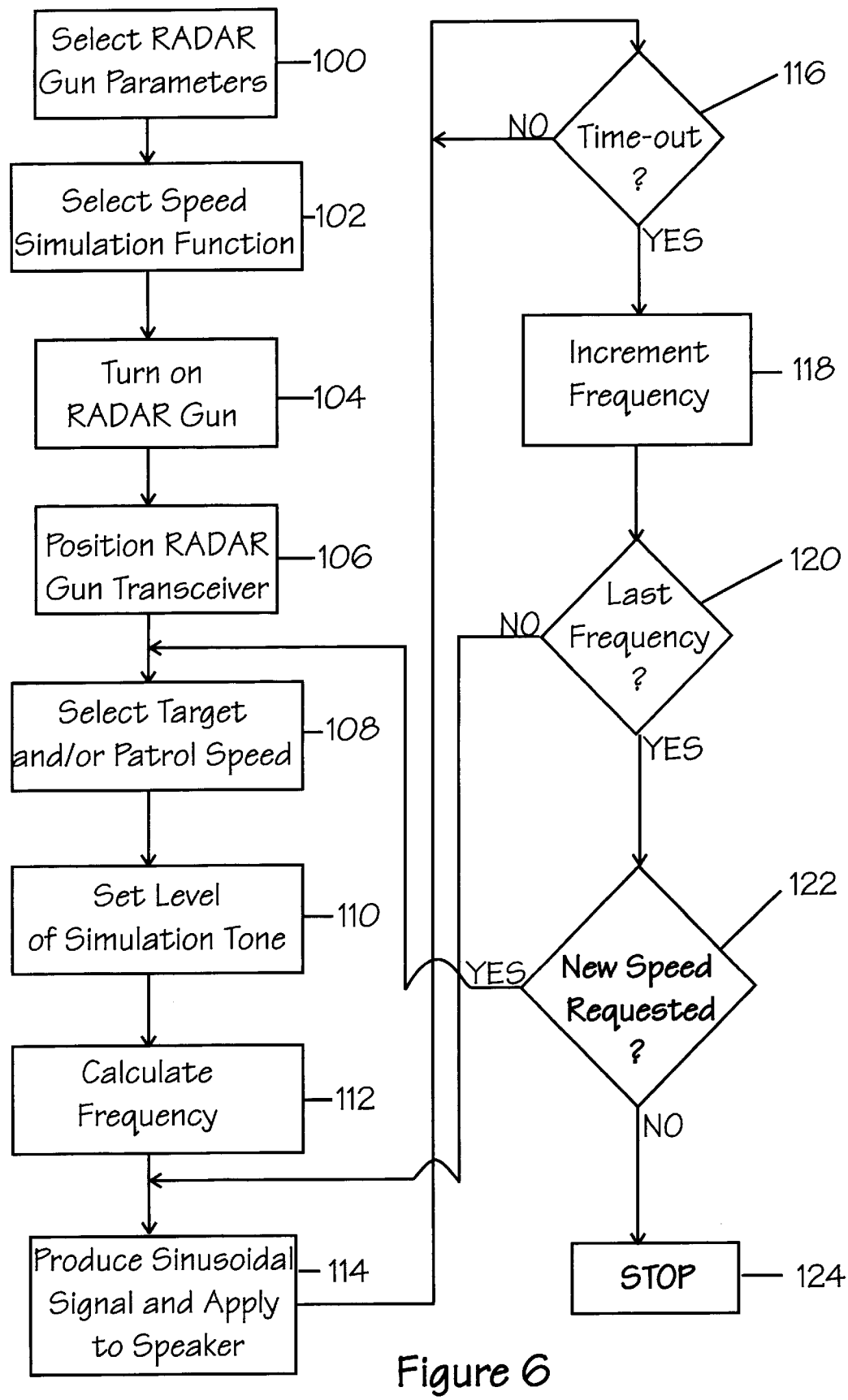
FIG. 6 is a flow chart of a speed simulation test.

To conduct a Speed Simulation test, the user proceeds as shown in FIG. 6.

First, the proper operating band and center frequency of the radar gun being certified are specified, via front panel controls 49, 51, 53, 55 or via the software running on the client computer 39, step 100.

Next, the Speed Simulation Function is selected, again via the front panel controls 49, 51, 53, 55 or via the software running on the client computer 39, step 102.

The radar gun 13, 17, 19 is turned on and set in operation as appropriate according to its operating instructions and the type of Speed Simulation test (Fixed or Moving Mode) being performed.

The radar gun transceiver 19 is next placed within range of the target speaker 31 and, if a Moving Mode test is being conducted, within range of the patrol speaker 27, step 106.

Various target and patrol speeds are next selected, as directed by the certification procedures unique to the user of the radar gun. Speeds may be selected via the front panel controls 49, 51, 53, 55 or via the software running on the client computer 39, step 108.

For each simulated speed, the volume or intensity of the simulation tone(s) is adjusted as required to enable the radar gun 13, 17, 19 to properly register speeds based on the tones. Volumes may be selected via the front panel controls 49, 51, 53, 55 or via the software running on the client computer 39. If needed, the user also adjusts the position of the radar gun transceiver 19 in relation to the target speaker 31 and patrol speaker 27 until a combination of conditions is reached that allows proper operation of the radar gun, step 110.

Based on the operating band and center frequency of the radar gun being certified, the software of DSP1 61a calculates the audio frequency freq required to simulate the selected speed, using the formula:

$$freq = speed * c\text{-factor}$$

where speed is in miles per hour. The conversion factor c-factor is determined by the formula:

$$c\text{-factor} = (xmit\text{-}freq * 2.98233)/1e9$$

where xmit-freg is the center frequency of the radar gun being certified. When freg has been determined, the period is calculated as 1/freg, step 112.

DSP1 61a uses a software algorithm to produce a single sine wave table for the tone to be emitted by the target speaker 31. When Moving Mode is being used, DSP1 61a also supplies values to DSP2 61b, via the synchronous serial bus connecting the two DSPs, to use a similar software algorithm to produce a second sine wave table for the tone to be emitted by the patrol speaker 27. Each point in a particular table is derived as $$point\ t = volume * sine(2 * pi * freq * t)$$

where t is incremented a given step at a time until it reaches the period. The step size depends on freg and is selected by the software algorithm to maintain a reasonably sized sine table while ensuring that freg is completely represented by the values in the table, step 114.

DSP1 61a (and DSP2 61b, if needed) initialize an interrupt driven timer, inherent to their capabilities, to provide an interrupt at a time interval corresponding to the frequency to be output, step 116. On each interrupt, the next value(s) from the sine wave table(s) are sent to the audio amplifiers driving the target speaker 31 and patrol speaker 27, step 118. This causes the speaker(s) to emit the required speed simulation tone(s). When the last value in each table is reached, DSP1 61a starts over at the beginning of the table again, step 120.

Whenever a front panel control 49, 51, 53, 55 is actuated, or when a command is received from the client computer 39, DSP1 61a checks to see if a tone volume or simulation speed value has changed and, if so, the new speed and volume values to recalculate the sine wave table(s) in the manner just described, step 122. If a new speed has been requested, control is transferred to block 108, otherwise, the process is ended, step 124.

When the calibration unit 5 is used independently of the client computer 39, DSP1 61a is also capable of automatically incrementing the target speed when so requested by the user. In this case, the target speed changes by a value of 5 miles per hour approximately once every 4 seconds. The user may also select either auto-increment or auto-decrement mode within this feature.

When the calibration unit 5 operates in conjunction with the client computer 39, the software in the client computer randomly selects target speeds. The display 47 of the Calibration unit 5 is blanked, and the software informs the user only that the result speed should be within a general range. The user can thus detect problems with the test process (if the radar gun display 13 shows values greatly outside the expected range) but the range of possible speeds is wide enough to preclude a random guess at the actual results. This forces the user to honestly conduct each step in the process.

This mode of operation ends when the DEVICE pushbutton 49 is pressed or when the calibration unit 5 receives a command from the client computer 39 to select a different test function.

Microwave Frequency Counter Function of Calibration Unit 5

Figure 7:
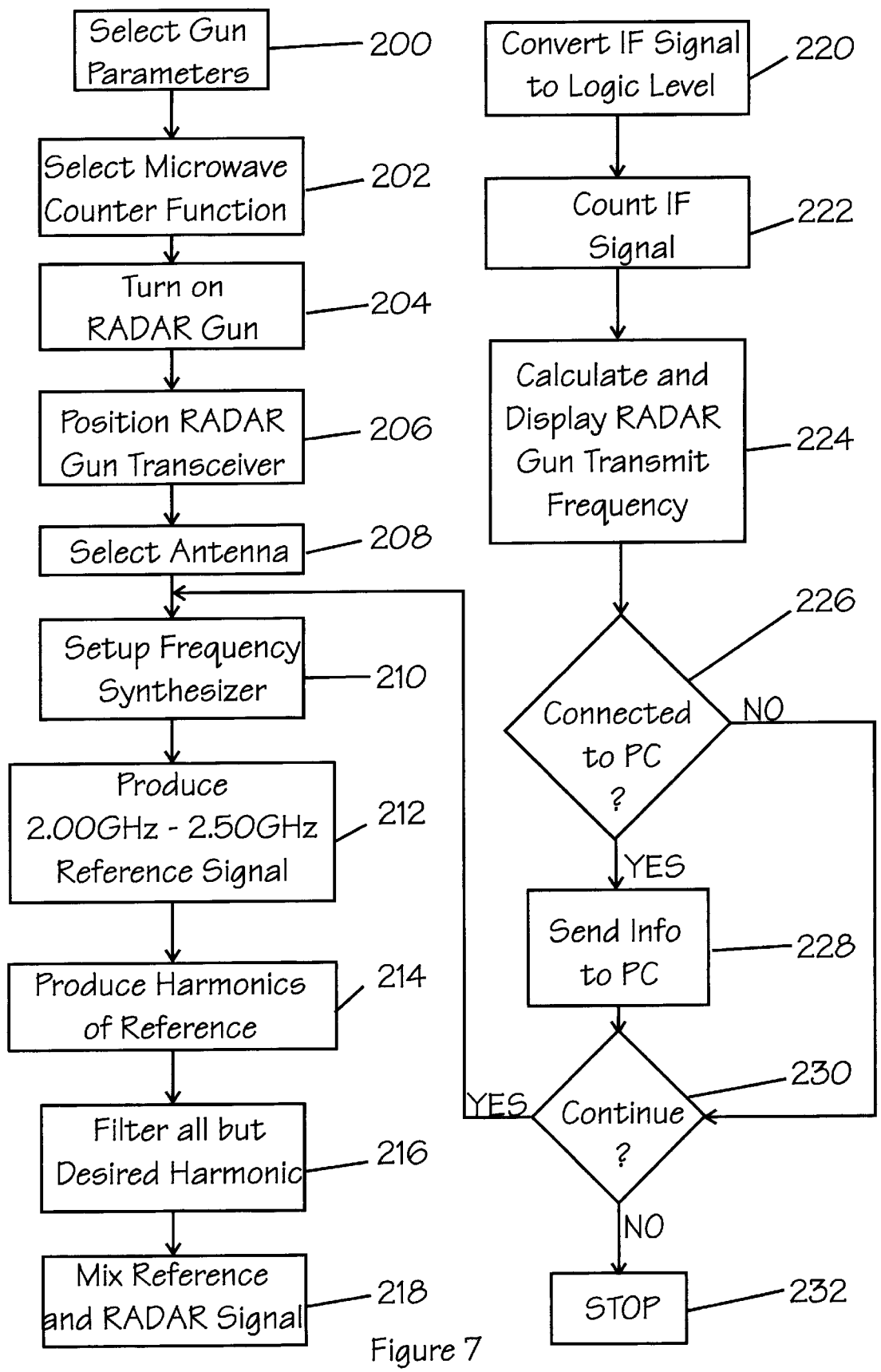
FIG. 7 is a flow chart of a microwave frequency counter test.

To measure the actual microwave frequency being emitted by a radar gun transceiver 19, the user proceeds as depicted in the flow chart of FIG. 7.

First the proper operating band and center frequency of the radar gun being certified are specified, via the front panel controls 49, 51, 53, 55 of the calibration unit 5 or via the software running in the client computer 39, step 200.

Next the Microwave Frequency Counter Function is selected, via the front panel controls 49, 51, 53, 55 or via the software running in the client computer 39, step 202.

The radar gun 13/17/19 is turned on and set in operation according to its operating instructions. Fixed Mode operation (described previously) is usually selected, step 204.

The radar gun transceiver 19 is placed within range of the appropriate antenna 9a/9b/9c within microwave receiver 9, as denoted by markings on the front panel of the calibration unit 5, step 206.

Based on the operating band of the radar gun being certified, DSP1 61a outputs a bit pattern to the microwave control register in CPLD 61c to select the proper antenna within the microwave receiver 9, via antenna selector 9d, step 208. Also based on the center frequency of the radar gun 13/17/19, DSP1 61a includes within the same bit pattern a value to select the proper scaling values for the frequency synthesizer 9e within the microwave receiver 9, step 210.

Using NIST-traceable 10 mHz oscillator 61j as a reference signal, the frequency synthesizer 9e produces a second reference signal between 2.000 and 2.250 GHz, step 212. This second reference signal is fed into a harmonic mixer 9f producing all the harmonics of the second reference signal, step 214. A filter 9g is used to select the correct harmonic for the operating band of the radar gun: 5th harmonic for X-Band, 11th harmonic for K-Band, and 16th harmonic for Ka-Band, step 216.

The selected harmonic feeds one input of a second mixer 9h, combining this signal and the signal being received from the radar gun 13/17/19 by the currently selected antenna 9a/9b/9c within the microwave receiver 9, step 218. The result is an intermediate frequency (IF) that is the difference between the selected harmonic and the actual signal from the radar gun 13/17/19, divided by 32.

The IF output of the second mixer 9h is converted to a logic level signal, step 220, and fed into the event counter of CPLD 61c to convert it to a numeric value. A one-second clock within CPLD 61c provides a one hertz pulse that latches the event counter value and signals DSP1 61a that a reading is ready to be obtained, step 222. DSP1 61a reads the resulting count value, multiplies it by 32, and adds that result to the frequency it previously calculated for the frequency synthesizer 9e. The final result is the actual output frequency of the radar gun, step 224.

When the calibration unit 5 is used independently of the client computer 39, the actual output frequency of the radar gun 13/17/19 is shown on display 47, and the user manually records the displayed value as appropriate to the certification procedure.

When the calibration unit 5 operates in conjunction with the client computer 39, the software in the client computer automatically retrieves the test results, step 228.

This mode of operation ends when the DEVICE pushbutton 49 is pressed or when the calibration unit 5 receives a command from the client computer 39 to select a different test function, step 232.

Microwave Power Density Meter Function of Calibration Unit 5

Figure 8:
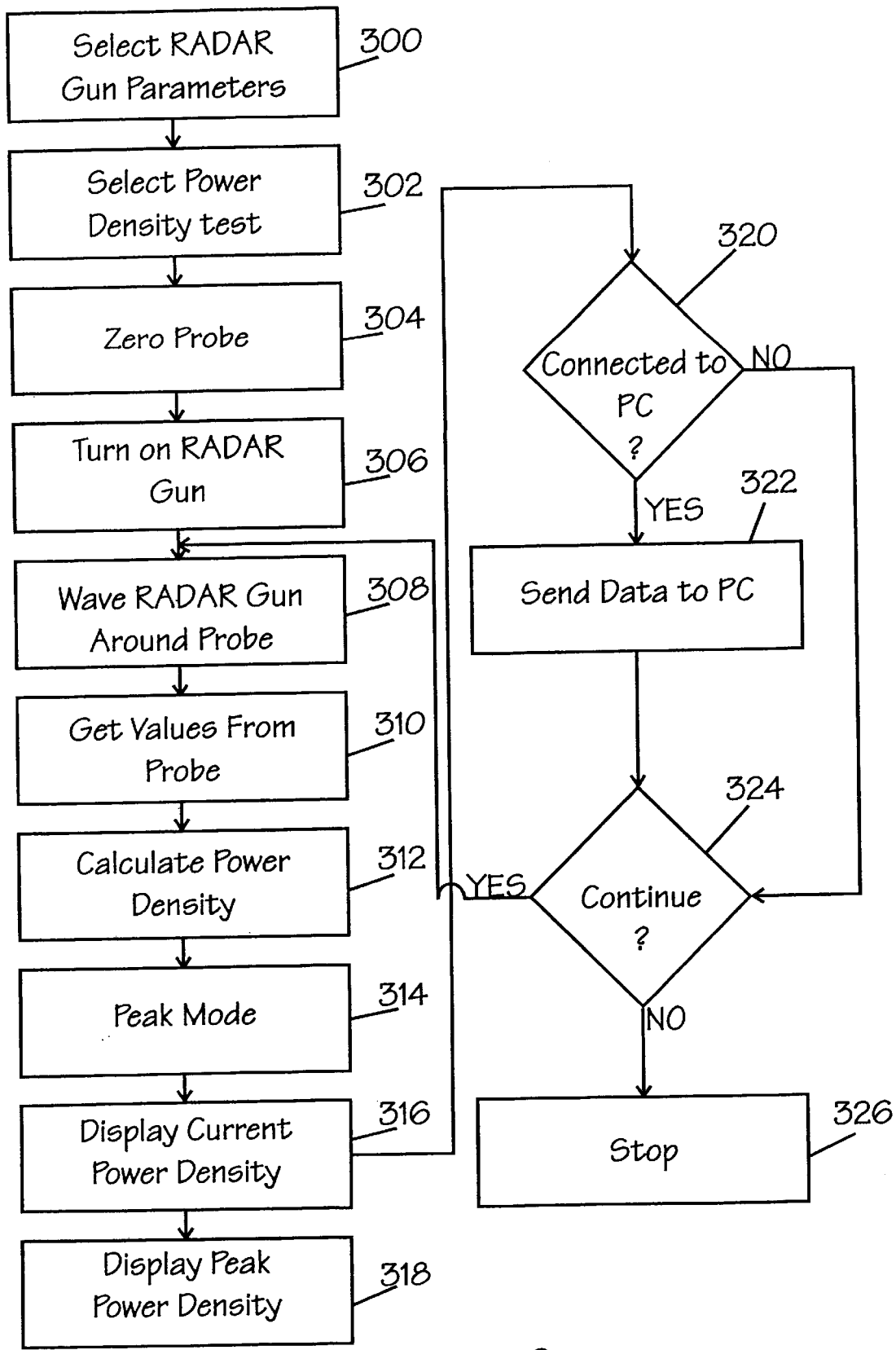
FIG. 8 is a flow chart of a power density measurement.

To measure the actual microwave power density of a radar gun transceiver 19, the user proceeds as shown in FIG. 8.

First the proper operating band and center frequency of the radar gun being certified 13, 17, 19 are specified, via the front panel controls 49, 51, 53, 55 of the calibration unit 5 or via the software running in the client computer 39, step 300.

Next the Microwave Power Density Function is selected, again via the front panel controls 49, 51, 53, 55 of the calibration unit 5 or via the software running in the client computer 39, step 302.

The power density probe 25 is connected to the Calibration unit 5. A microwave "sock" is placed over the probe 25 and the probe 25 is zeroed (via the front panel controls 49, 51, 53, 55 of the calibration unit 5 or via the client computer 39), establishing a baseline value representing zero microwave power for the following test. After zeroing, the microwave "sock" is removed from the probe 25, step 304.

The radar gun 13/17/19 is turned on and set in operation according to its operating instructions. Fixed Mode operation (described previously) is usually selected, step 306.

The user waves the radar gun transceiver 19 about and around the power density probe 25 as required to cause the probe 25 to generate power density readings, step 308.

DSP1 61a has commanded DSP2 61b to begin taking readings from the power density probe 25, with the output of the power density probe 25 connected to the input of ADC 61f, converting the analog output of power density probe 25 into a binary value. DSP2 61b takes periodic readings from ADC 61f and transmits these readings to DSP1 61a via the synchronous serial port connecting the two DSPS, step 310.

DSP1 61a uses the readings obtained from DSP2 61b to calculate the transmitter power density in miliwatts per centimeter squared, using the formula:

$$\text{value read} * 762.94e\text{-}6$$

This formula is derived from the fact that a 1 volt change in the output of the power density probe 25 represents 20 milliwatts per centimeter squared of transmitter power, step 312.

DSP1 61a always calculates the real-time power density value; this number can change constantly as the radar gun transceiver 19 is moved around over the power density probe 25, step 316. A peak hold mode is available to the user to save the highest reading from all the readings obtained, step 318.

When the calibration unit 5 is used independently of the client computer 39, the actual output power density of the radar gun 13/17/19 is shown on display 47, and the user manually records the displayed value as appropriate to the certification procedure.

When the calibration unit 5 operates in conjunction with the client computer 39, the software in the client computer 39 automatically retrieves the test results, step 322.

This mode of operation ends when the DEVICE pushbutton 49 is pressed or when the calibration unit 5 receives a command from the client computer 39 to select a different test function, step 326.

Tuning Fork Gauge Function of Calibration Unit 5

Radar gun manufacturers generally supply two tuning forks 1 with each radar gun. When struck, the tuning fork emits an audio tone representing a certain speed for that radar gun, which in turn can be used to quickly check the operation of the radar gun.

Figure 9:
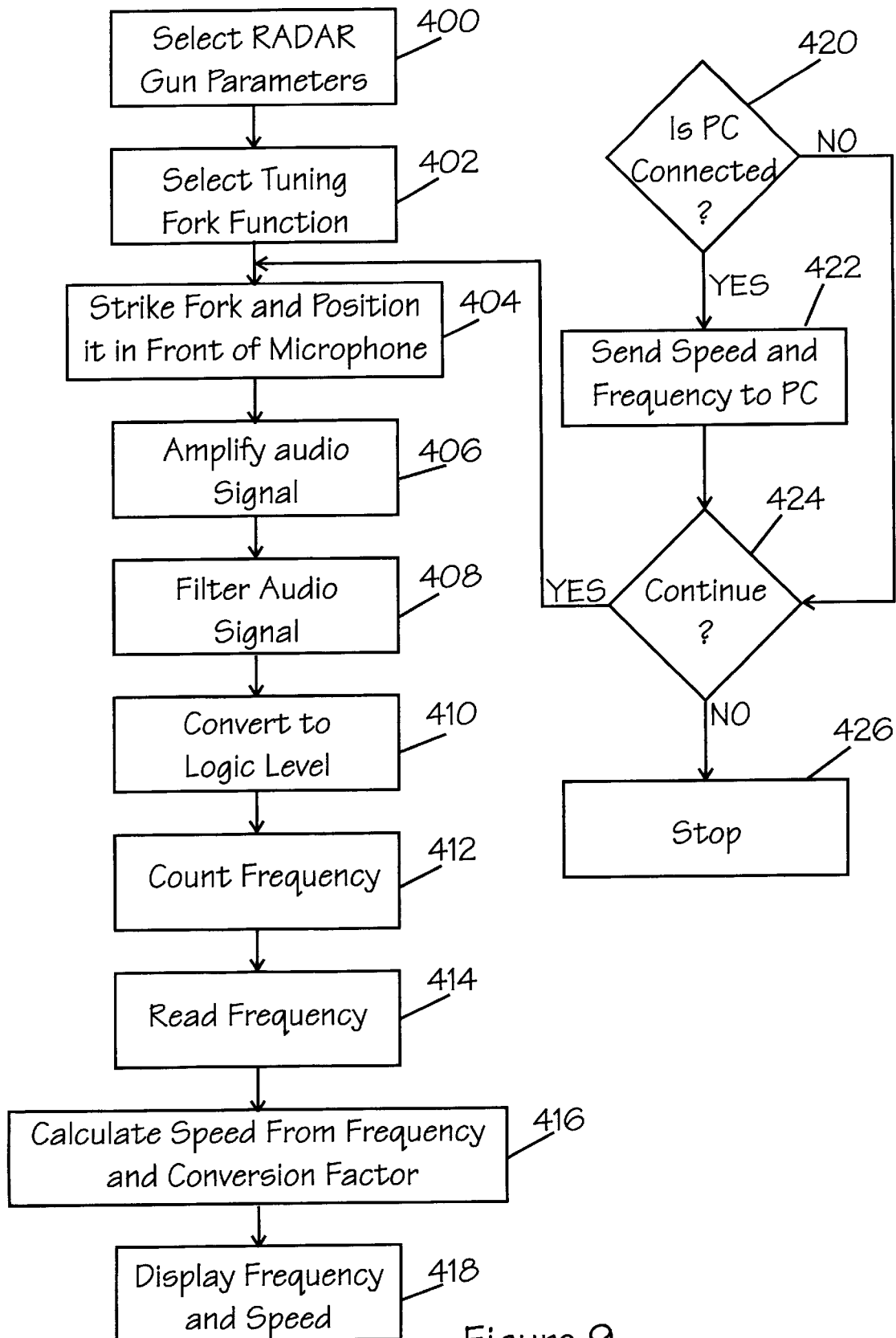
FIG. 9 is a flow chart of a tuning fork calibration test.

To measure the actual audio output frequency of a radar gun tuning fork 1, the user proceeds as shown in FIG. 9.

First the proper operating band and center frequency of the radar gun that the tuning fork 1 goes with are specified, via the front panel controls 49, 51, 53, 55 of the calibration unit 5 or via the software running in the client computer 39, step 400.

Next the Tuning Fork Gauge Function is selected, via the front panel controls 49, 51, 53, 55 of the Calibration unit 5 or via the software running in the client computer 39, step 402.

The user strikes the tuning fork 1 and places it in front of the microphone 7, step 404. The audio tone 3 produced by the tuning fork 1 is received by microphone 7 and amplified by microphone preamplifier 63a, step 406.

The resulting signal is passed through a series of filters 63b to remove any unwanted resonant frequencies, step 408. The post-filter signal is converted to a logic level signal by circuits 63c, step 410, and fed into the event counter of the CPLD 61c to convert it to a numeric value. A one-second clock within CPLD 61c provides a one hertz pulse that latches the event counter value and signals DSP1 61a that a reading is ready to be obtained, 412.

DSP1 61a reads the resulting count value, the actual audio frequency of the tuning fork in hertz, step 414.

Based on the operating band and center frequency of the radar gun 13/17/19 the tuning fork 1 goes with, DSP1 61a next calculates the speed that this audio tone represents, using the formula:

$$\text{speed} = \text{tone frequency}/\text{conversion factor}$$

where conversion factor is $$(\text{xmit-freq} * 2.98233)/1e9$$

In this formula, xmit-freq is the operating center frequency of the radar gun tuning fork 1 goes with, step 416.

When the calibration unit 5 is used independently of the client computer 39, the actual measured frequency of tuning fork 1 and the speed this represents is shown on display 47, and the user manually records the displayed values as appropriate to the certification procedure, step 418.

When the calibration unit 5 operates in conjunction with the client computer 39, the software in the client computer 39 automatically retrieves the test results, step 422.

This mode of operation ends when the DEVICE pushbutton 49 is pressed or when the calibration unit 5 receives a command from the client computer 39 to select a different test function, step 426.

Operation of Server Computer 45

In the paragraphs that follow, a "subscriber" is a law enforcement agency or other organization owning one or more radar guns and having at least one client computer 39 which is in turn interfaced with at least one calibration unit 5.

The server computer 45 utilizes a combination of hardware and software to provide the following functions.

The server computer 45 supports multiple external data transfer connections 45i, allowing it to communicate simultaneously with more than one subscriber.

The server ensures data integrity through automatic mirroring of the non-volatile storage media 45c. Manual procedures by the server 45 operator also include periodic backups of the data with the backups stored off-site.

The server manages the whole of a subscriber base, and the radar guns and certification data for each, via a series of database files:

a) A main database contains top-level information about all subscribers and provides pointers to next-level database files containing more detailed information about each particular subscriber.

b) The detailed individual subscriber databases contain information required to manage each subscriber account. These databases also list the radar guns owned by that subscriber and provide top-level information about each radar gun; each radar gun's data also contains a pointer to a next-level database file containing the certification data record for that particular radar gun.

c) The radar gun databases contain recorded data for all certifications conducted on each radar gun. The data in these databases is write-only to the subscriber.

Those skilled in the art will recognize that a wide variety of database configurations are possible that will provide this same result.

Certification data arrives at the server 45, from each subscriber, in encrypted form, with the encryption having been performed by the client computer 39 prior to transfer of the data. Encryption is used to minimize the possibility of a subscriber falsifying certification data. The data received from the client computer 39 contains instructions in SQL format that allow the server 45 to make the necessary changes to each data file at the server. Those skilled in the art will recognize that other forms of data change instructions could be used to achieve the same result.

When requested by the server 45 operator, the server 45 produces a certification validation document for each radar gun it has processed. These documents are signed by authorized personnel and forwarded to the subscriber as proof of radar gun certification.

If certification data is found to be in error after it has been accepted by the server 45, the server 45 provides functions allowing a certification to be invalidated. This includes updating the top-level database and producing documents to be signed by authorized personnel and forwarded to the subscriber.

When requested by the server 45 operator, the server 45 produces a certification report, in a standardized format, that can be signed by authorized personnel and forwarded to a court of law for use in supporting the radar gun accuracy claims of a subscriber.

The server 45 maintains accounting records and is capable of issuing billing documents to each subscriber as required. Moreover, the server 45 has the ability to automatically generate reminder notices and failure-to-recertify notices that may be subsequently forwarded to subscribers.

Each time a client 39 connects to the server 45, the server 45 checks the software version level of the client 39. If the version level is not the correct latest revision, the server 45 automatically updates the client 39 software to the correct level. The subscriber, therefore, need never be concerned that the client 39 software in use at the subscriber's facility is not compatible with the server 45 or that it lacks newly-introduced features.

The server 45 provides maintenance functions as required by its operator in monitoring and controlling the activities of the server 45.

Operation of Client Computer 39

In the paragraphs that follow, a "subscriber" is a law enforcement agency or other organization owning one or more radar guns and having at least one client computer 39 which is in turn interfaced with at least one calibration unit 5.

The client computer 39 is usually located at the subscriber's facility and interfaced to the calibration unit 5. It utilizes a combination of hardware and software to provide the following functions.

The client allows the use of a pointing device 39g to manipulate intuitive simulations of the calibration unit 5 controls and functions, shown on the display 39f.

The client maintains a copy of the aforementioned top-level database for the subscriber, allowing the user to select a radar gun to be certified from a list of existing radar guns, and automatically configures the calibration unit 5 for the operating band and center frequency associated with the selected radar gun. This allows the subscriber to quickly check the last certification date of each radar gun.

The client maintains additional information about each radar gun in the subscriber's top-level database that increases ease of use and helps automate the certification process, taking into account variations in operation between the various types of radar guns the subscriber may have.

While performing a Speed Simulation test, the client 39 prohibits data entry if certain conditions are not met that might indicate false data is being entered; i.e., if the calibration unit 5 is not connected and responding, if speaker volumes are not adjusted, etc.

The client encrypts certification results using XOR-encryption, based on a separately encrypted date and time stamp, performs positional manipulation of the resulting encrypted data to provide further protection. This results in an encryption scheme that changes for every single data set and is very difficult to defeat, while being simple to implement in software.

The client allows the subscriber to add new radar guns to the top-level database, performs an initial sequence of setup operations for that radar gun that allow it to be easily certified in the future.

The client allows the subscriber to invalidate radar gun certifications when so instructed.

The client has the ability to retrieve the top-level database from the server 45, independently of other operations, to allow restoration of the top-level database in the event of a hardware failure in the client 39 that causes loss of data.

The client allows a subscriber to request certification reports for use in a court of law, and allows a subscriber to remove a radar gun from service.

The client provides various option-setting capabilities as required to manipulate the particular hardware comprising the client computer 39.

The client has the ability to download the latest version of itself and initiate an automatic upgrade process.

This ensures that the client 39 software is always at the latest available revision level.

The client includes easily-accessible help instructions to guide the user through all aspects of its operation.

The client has the ability to receive messages from the server 45 to warn of upcoming events, such as scheduled service outages (i.e., for upgrades to the server 45).

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A self-contained, multi-function test and measurement apparatus for use with a Doppler effect microwave frequency radar gun, comprising:
   a) internal control means for selecting and directing a plurality of test and measurement functions;
   b) means, electrically connected to said internal control means, for performing a frequency measurement of a microwave signal generated by said radar gun;
   c) means, electrically connected to said internal control means, for performing a microwave power density measurement of said signal; and
   d) means, electrically connected to said internal control means, for performing a speed simulation test of said radar gun;
   whereby at least one of said plurality of test and measurement functions is selectively performed on said radar gun as directed by said internal control means.

2. The self-contained, multi-function test and measurement apparatus for use with a Doppler effect microwave frequency radar gun as recited in claim 1, further comprising:
   e) means, electrically connected to said internal control means, for measuring the frequency of an external, audio frequency signal.

3. The self-contained, multi-function test and measurement apparatus for use with a Doppler effect microwave frequency radar gun as recited in claim 2, wherein an external, audio frequency signal is generated by a tuning fork.

4. The self-contained, multi-function test and measurement apparatus for use with a Doppler effect microwave frequency radar gun as recited in claim 1, wherein said internal control means further comprises external control means and means for interfacing to said external control means whereby said external control means acts cooperatively with said internal control means to select and direct at least one of said plurality of test and measurement functions.

5. The self-contained, multi-function test and measurement apparatus for use with a Doppler effect microwave frequency radar gun as recited in claim 4, wherein said external control means comprises a local, digital computer.

6. The self-contained, multi-function test and measurement apparatus for use with a Doppler effect microwave frequency radar gun as recited in claim 5, wherein at least one of said internal control means and said local, digital computer is pre-programmed with instructions for selecting and directing at least one of said plurality of tests and measurement functions.

7. The self-contained, multi-function test and measurement apparatus for use with a Doppler effect microwave frequency radar gun as recited in claim 4, wherein at least one of said internal and external control means collects data representative of a result of at least one of said plurality of test and measurement functions.

8. The self-contained, multi-function test and measurement apparatus for use with a Doppler effect microwave frequency radar gun as recited in claim 7, wherein said data is stored in at least one of said internal and external control means.

9. The self-contained, multi-function test and measurement apparatus for use with a Doppler effect microwave frequency radar gun as recited in claim 8, wherein said external control means further comprises means for allowing communication between said external control means and a remote computer system.

10. The self-contained, multi-function test and measurement apparatus for use with a Doppler effect microwave frequency radar gun as recited in claim 9, wherein said means for allowing communication between said external control means computer and a remote computer system comprises an internet connection.

11. The self-contained, multi-function test and measurement apparatus for use with Doppler effect microwave frequency radar gun as recited in claim 8, wherein said remote computer works cooperatively with said external control means to selectively direct at least one of said plurality of test and measurement functions.

12. The self-contained, multi-function test and measurement apparatus for use with Doppler effect microwave frequency radar gun as recited in claim 11, wherein said remote computer works cooperatively with said external control means to store data representative of at least one of said plurality of test and measurement functions.

13. The self-contained, multi-function test and measurement apparatus for use with a Doppler effect microwave frequency radar gun as recited in claim 8, wherein said result is compared to a predetermined standard to determine compliance of said radar gun with said predetermined standard.

14. The self-contained, multi-function test and measurement apparatus for use with a Doppler effect microwave frequency radar gun as recited in claim 1, wherein at least one of said internal and an external control means collects and stores data representative of a result of at least one of said plurality of test and measurement functions.

15. The self-contained, multi-function test and measurement apparatus for use with a Doppler effect microwave frequency radar gun as recited in claim 14, further comprising means for displaying said data.

16. The self-contained, multi-function test and measurement apparatus for use with a Doppler effect microwave frequency radar gun as recited in claim 14, wherein said result is compared to a predetermined standard to determine compliance of said radar gun with said predetermined standard.

17. The self-contained, multi-function test and measurement apparatus for use with a Doppler effect microwave frequency radar gun as recited in claim 16, wherein said predetermined standard resides in said remote computer system.

18. The self-contained, multi-function test and measurement apparatus for use with a Doppler effect microwave frequency radar gun as recited in claims 17, wherein said predetermined standard residing in said remote computer system comprises a set of standards and said plurality of tests comprises all tests necessary to measure compliance of said radar gun to said set of standards.

19. The self-contained, multi-function test and measurement apparatus for use with a Doppler effect microwave frequency radar gun as recited in claim 1, further comprising operator control means works cooperatively with said internal control means to select and direct at least one of said plurality of test and measurement functions.

* * * * *